United States Patent
Fairbanks

[15] 3,673,057
[45] June 27, 1972

[54] CELLULAR STRUCTURES
[72] Inventor: Theodore H. Fairbanks, Liverpool, Pa.
[73] Assignee: FMC Corporation, Philadelphia, Pa.
[22] Filed: July 22, 1970
[21] Appl. No.: 57,093

Related U.S. Application Data
[62] Division of Ser. No. 714,231, March 19, 1968, Pat. No. 3,616,025.

[52] U.S. Cl..................................161/68, 156/256, 156/311, 161/110, 161/111
[51] Int. Cl........................................................B32b 3/12
[58] Field of Search..............161/68, 69, 110, 111; 156/197, 156/256, 311; 29/455 LM; 52/615

[56] References Cited

UNITED STATES PATENTS

| | | |
|---|---|---|
| 3,338,774 | 8/1967 | Dijksterhuis et al...................156/472 |
| 3,552,086 | 1/1971 | Allen....................................161/68 X |
| 2,983,038 | 5/1961 | Johnson..........................29/455 LM X |
| 3,018,209 | 1/1962 | Dijksterhuis et al................161/68 X |
| 3,266,790 | 8/1966 | Bradeen.............................161/113 X |

Primary Examiner—John T. Goolkasian
Assistant Examiner—Henry F. Epstein
Attorney—Thomas R. O'Malley, George F. Mueller and Eugene G. Horsky

[57] ABSTRACT

A cellular structure having a plurality of walls extending along intersecting planes and together providing abutting cells, such walls being connected at their locations of intersection by cruciform sections and formed by flexing portions of a slit web material into planes disposed at angles to the plane of the original web material.

5 Claims, 9 Drawing Figures

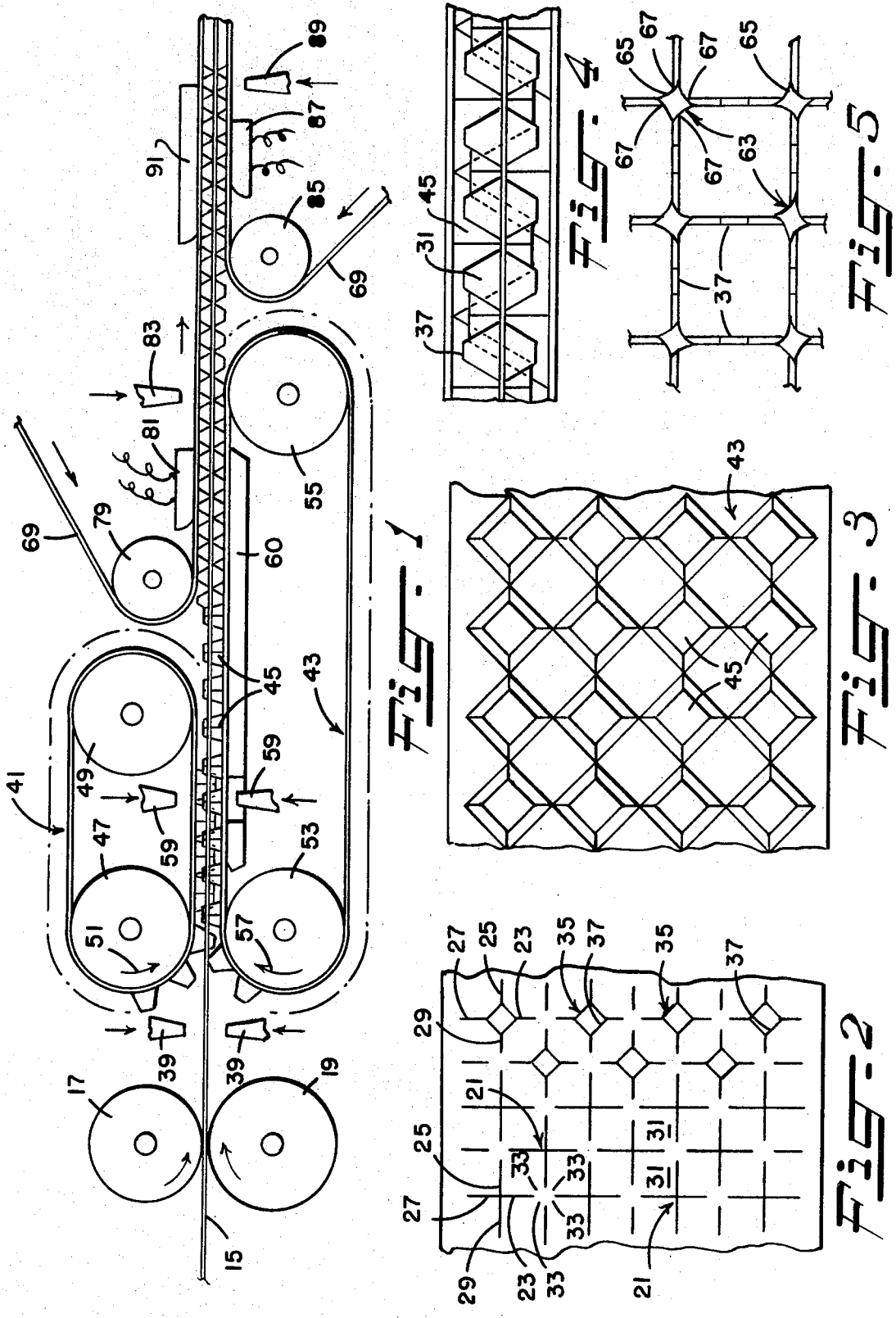

CELLULAR STRUCTURES

This application is a division of my application Ser. No. 714,231, filed Mar. 19, 1968, now U.S. Pat. No. 3,616,025.

The invention relates to articles of cellular construction.

Members of cellular, and more particularly of honeycomb construction, are light in weight and provide substantial structural volume, rigidity and strength for the relatively small amount of material used in their construction. Such honeycomb members have, therefore, found wide application in many fields, as for example, load-bearing floors, ceilings, and walls; as reinforcing cores or panels in flush doors; as rigid article separators or spacers; as grilles or screens for suspended ceilings and light fixtures; etc.

Honeycomb structures can be manufactured by a variety of known methods. Perhaps one of the most common methods involves interlocking of slotted strips or slats in crossing relationship. In another known procedure, strips of suitable material are bent, with sharp corners, into a corrugated form and then connected to each other in side-by-side relationship to provide a series of abutting cells. These and other known methods for making honeycomb structures often require expensive materials, generally involve a number of machining steps and/or manipulations of the different members during assembly and are usually not suited for rapid manufacture of continuous cellular or honeycomb structures. Accordingly, a primary object of this invention is to provide a generally new or improved and more satisfactory cellular or honeycomb structures.

Another object is the provision of an improved honeycomb structure which is light in weight, possess good structural volume, rigidity and strength and can be made from inexpensive materials and with low manufacturing costs.

Another object is the provision of an improved, integral honeycomb structure formed of a single web material.

Still another object is the provision of an improved composite product having a honeycomb structure as a core.

These and other objects are accomplished in accordance with the present invention by cellular structures which are produced by a method in which a pliable web material is slit along only a portion of the length of each of a series of lines defining a plurality of abutting parallelograms, with adjacent parallelograms abutting along a common line. The slits of the individual parallelograms meeting or intersecting at only one pair of diagonally opposed corners thereof and terminating short of their other pair of diagonally opposed corners. Thus, ends of such slits are separated by narrow neck sections of web material. Each of the portions of the web material extending between these neck sections is then pivoted as a planar unit by flexing or twisting the web material in the areas of the neck sections into a helical configuration. The free corners of the individual parallelograms; that is, the diagonally opposed corners thereof at which the slits meet, are thus moved in opposite directions away from the plane of the original web material.

As noted above, the web material must be pliable to permit the neck sections thereof to be flexed or twisted into helical shapes without tearing. A variety of web materials may be employed in making the cellular structures of the present invention, including materials which are thermoplastic, such as polyamides or superpolyamides, polyesters, polyvinyl chlorides, and copolymers thereof, polyolefins, and cellulose acetates; thermosetting materials; metals, such as aluminum, copper, brass, sheet steel; papers; fabrics; and etc.

With the exception of the web materials formed of ductile metals, it is generally necessary to set the pivoted portions of the web material to fix the same in position. Thus, with web materials which are of thermoplastic character, the portions of the web material which extend between the neck sections may be in a heat-softened condition while being pivoted and then cooled to set the same in fixed positions. Thermosetting web material may, of course, be set by heat, while materials, such as papers or fabrics may be fixed by the application of coatings capable of being hardened or otherwise stabilized.

The slits formed in the web material must together define a plurality of abutting parallelograms; that is, with adjacent parallelograms abutting along a common slit. The lengths of the neck sections of web material between the ends of the slits must be such as to permit the same to easily flex or twist as the portions of the web material extending between such neck sections are pivoted as planar units. The lengths of these neck sections of web material will depend, to some degree, upon the particular characteristics of the web material employed.

In honeycomb structures intended primarily for decorative applications, such as screens or grilles, the slits formed in the web material may be such as to define parallelograms of different sizes. If further desired, the portions of the web material extending between the neck sections thereof may be pivoted, as planar units, to different degrees relative to the original plane of the web material.

Honeycomb structures which possess substantial strength and rigidity are formed by initially providing a web with slits which are of equal length, and preferably extend at right angles to each other. The portions of the web material extending between the neck sections thereof are then pivoted, as planar units, through an angle of 90° from the original plane of web material and, if necessary, set in such positions.

The cellular or honeycomb structure of the present invention, as produced by the above-described method, includes a series of walls extending along each of a plurality of planes which intersect with each other, with sections of cruciform configuration integrally connecting the walls to each other at the locations of intersection of their respective planes. These cruciform sections each have a central portion, disposed in a plane extending at an angle to the planes of the series of walls, and legs of helical shape extending between the central portion of the cruciform section and the walls adjacent thereto. Desirably, the central portions of the cruciform sections are disposed in a plane which is substantially perpendicular to the planes of the series of walls, and the walls themselves are preferably located along planes which intersect at substantially right angles with each other.

Structures of still greater strength and rigidity than those heretofore described are provided by attaching a continuous sheet, web material or other flat member to at least one and preferably both sides of the honeycomb structure to thereby form a composite product. Attachment of such continuous sheets may be effected by projecting the free corners of the pivoted portions of the web material through suitable slots formed in the sheets themselves. These projecting corners are then distorted, as by bending, twisting, or are heat-softened to lock the sheets in place.

An alternative procedure for making a composite product using the honeycomb structure as a core entails removing the free corners of the portions of the web material supported between the neck sections prior to pivoting of such portions. Such free corners may be removed by cutting the same along lines extending generally perpendicular to a line extending between such free corners. The edges thus provided will extend generally parallel to the original plane of the web material after the portions of the web material extending between the neck sections are pivoted into planes substantially perpendicular to their original planes. A continuous sheet, web material or other flat member is then fixed to these edges of the pivoted portions of the web material, as by adhesives, heat, etc.

In the composite products described, it will be apparent that the sheets fixed to the honeycomb structure maintain the pivoted portions thereof in the fixed positions. Moreover, such attached sheets serve also to distribute loads over a large area of the composite product and, if desired, may be made fluid-tight to impart buoyant and perhaps heat-insulating characteristics to such products.

The continuous sheets or other flat members of the composite products described above may be formed of any desired materials and may be the same or different from that of the honeycomb structure itself. Such sheets may include various additives, such as colorants, stabilizers, etc., if desired or necessary and, in the case of plastic materials, may be of transparent or translucent character.

The apparatus employed in making the cellular structure of the present invention includes means for providing a pliable web material with closely-spaced rows of cross-cuts in which the cross-cuts of alternate rows are located between the ends of cross-cuts in the rows adjacent thereto, a first and second series of pyramid-shaped projections for engaging with opposite sides of the web material, respectively, at the locations of the cross-cuts, with the projections of two series thereof being in staggered relationship, and means for moving the first and second series of projections toward each other and through the web material to thereby deflect portions thereof from their original plane. Preferably, the apparatus is designed for continuous manufacture of honeycomb structures. Thus, the means for cutting the web material as well as the two series of projections are carried by suitable rollers or belt conveyors so as to permit the same to perform their intended operations on a web material concomitantly with its continuous travel.

To facilitate the manufacture of composite products of the character as heretofore described, the apparatus which is employed also includes, in one embodiment, means for providing a continuous sheet with slits at spaced locations corresponding with the spacing of the deflected portions of the web material, means for disposing the slit sheet onto the deflected portions of the web material so that such portions project partially through the slit sheet, and means for distorting the projecting parts of the deflected portions of the web material to thus lock the sheet in place.

In another embodiment of the apparatus employed in making the cellular structure of the present invention, means are provided for cutting the web along lines extending between adjacent slits of each of the cross-cuts, to thereby remove a rectangular section of web material therefrom, and means positioned beyond the series of projections for attaching a continuous sheet to the outermost edges of the deflected portions of the web material.

In the drawing,

FIG. 1 is a diagrammatic side view of an apparatus employed in making cellular structures of the present invention;

FIG. 2 is a plan view of a portion of a web material following a slitting stage by the apparatus shown in FIG. 1;

FIG. 3 is a fragmentary plan view of a portion of the apparatus shown in FIG. 1;

FIG. 4 is a view similar to FIG. 1 showing a portion of the apparatus on an enlarged scale and illustrating its operation;

FIG. 5 is a plan view of a portion of a honeycomb structure of the present invention;

Figure 8:
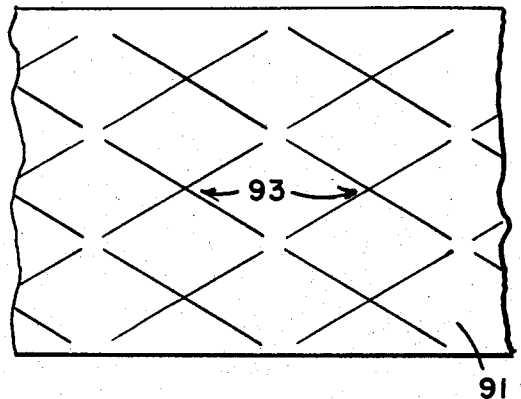
FIGS. 8 and 9 are views similar to FIG. 2 showing web materials with modified arrangements of slits.

With reference to FIG. 1 of the drawing reference character 15 indicates a continuous web material and particularly a thermoplastic film, such as of polyethylene, which is drawn from a suitable source and shaped into a cellular or honeycomb structure as it is continuously advanced through the apparatus which is illustrated. Upon entry into the apparatus, the film 15 passes between a cutter roll 17 and a back-up roll 19 which together provide the film with rows of cross-cuts 21. As shown in FIG. 2, the cross-cuts 21 in alternate of such rows are located between the ends of the cross-cuts 21 in the rows which are adjacent thereto.

The cross-cut 21 each consist of four individual slits 23, 25, 27 and 29. These individual slits of the different cross-cuts 21 extend along only a portion of the length of each of a series of lines which together define a series of abutting parallelograms or square portions 31. In each of these square portions 31, the slits forming the same meet or intersect at only one pair of opposed corners thereof. At the other pair of such opposed corners thereof, the individual slits terminate just short of each other and are separated at their ends by narrow neck sections 33.

If desired, a square segment 35 of the film 15 is removed from the center of each of the cross-cuts 21, preferably simultaneously with the formation of such cross-cuts. The edges 37 provided by the removal of these square film segments 35 extend substantially perpendicular to lines drawn between opposed corners of the square portions 31 and after film shaping, as hereafter described, will be in planes which are parallel to the original plane of the film.

Upon the movement of the film 15 beyond the rolls 17 and 19 it is impinged along its opposite sides by hot gases delivered by nozzles 39, and then advanced inbetween a pair of endless belts 41 and 43, both of which include a series of truncated, pyramid-shaped projections 45. The hot gases which are discharged from the nozzles 39 are not intended to melt or cause undesired flow of the film material but merely soften the same.

The endless belt 41 is laced over drums 47 and 49, at least one of which is driven in the direction of arrow 51. The belt 43 is likewise laced over drums 53 and 55, at least one of which is driven in the direction of arrow 57. Between the reaches of the respective belts 41 and 43 are disposed nozzles 59 for directing cool air against the opposing belt reaches and the portion of the film therebetween. For purposes as described hereafter, the reaches of the belt 43 are longer than that of the belt 41 and thus its uppermost reach is supported against sagging by a fixed table 60.

As shown in FIG. 3, the projections 45 of the belt 43 are positioned to engage with one side of the film 15 at the locations of the cross-cuts 21 in alternate longitudinally extending rows thereof. Further, it will be noted that the projections 45 of the belt 43 are each disposed so that the corners thereof will be aligned with the slits of the cross-cuts.

As each of these projections 45 of the belt 43 move into engagement with one side of the film 15, four of the portions 31 are simultaneously pivoted as planar units about their respective neck sections 33 and are urged toward positions as shown in FIG. 4. The projections 45 of the belt 41 are intended to engage the opposite side of the film 15, but only at the locations of cross-cuts 21 which are not engaged by projections 45 of the belt 43. Thus, the projections 45 of both belts 41 and 43 together cooperate in pivoting the film portions 31 and in maintaining the same in vertical planes, as shown in FIG. 4, as they are advanced relative to the nozzles 59 where they are cooled and set in place.

The cellular or honeycomb structure 61 which is produced may be then removed from between the belts 41 and 43. In such structure, as shown in FIG. 5, the portions 31 of the original film 15 extend along planes which intersect each other at substantially right angles. Between such portions 31 are cruciform sections 63, each of which includes a central portion 65 and legs 67 of helical configuration. The central portions 65 of the cruciform sections all lie in a plane which is substantially perpendicular to the planes of the portions 31. The helical shaped legs 67 are, in effect, the film neck sections 33 after they have been twisted during the pivoting of the portions 31.

Figure 6:
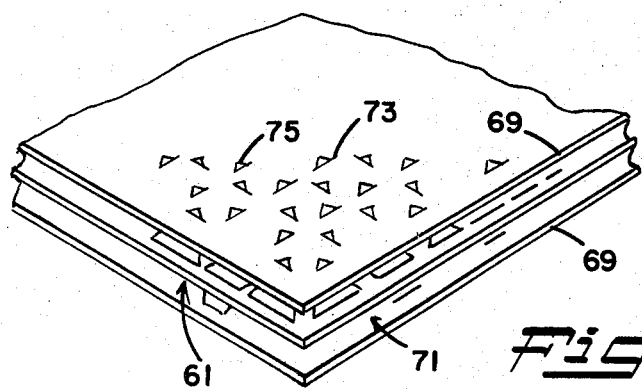
FIG. 6 illustrates a cellular or honeycomb structure of the present invention employed as a core of a composite product.

In lieu of removing the honeycomb structure 61 from the apparatus, continuous sheets or films 69 may be attached to one and preferably to opposite sides thereof to provide a composite product 71 as shown in FIG. 6. As heretofore mentioned, square segments 35 of the film 15 need not be removed and in such instance the free corners of the film portions 31 will appear in the resulting honeycomb structure 61 at locations between the cruciform sections 63. The films 69 may therefore be slit at 73 to receive the corners of the portions 31 of the structure 61 and then be bent over as shown at 75 to lock the films 69 in place.

Figure 7:
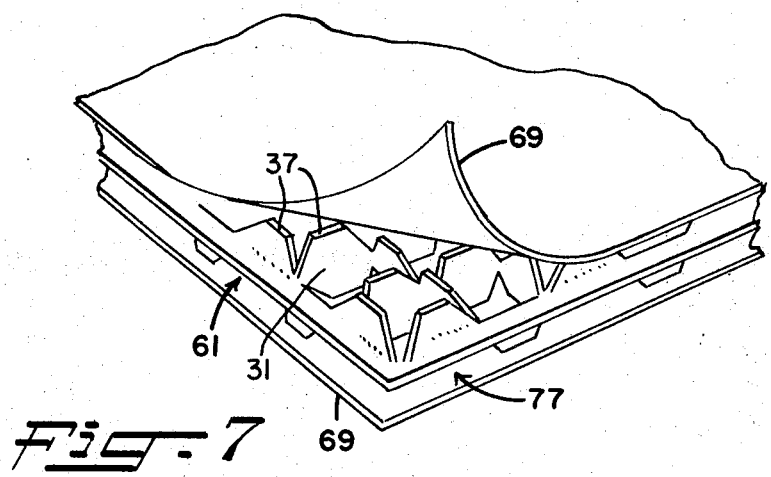
FIG. 7 is a view similar to FIG. 5 showing a composite product of modified construction.

On the other hand, with removal of the square film segments 35, the film 69 may be attached to the edges 37 of the portions 31 of the resulting honeycomb structure 61 to provide a composite product 77 as shown in FIG. 7. More particularly, and as shown in FIG. 1, a film 69 may be guided about a roller 79 and laid onto the uppermost surface of the honeycomb structure 61. As such honeycomb structure 61 and film 69 are together carried continuously by the upper reach of the belt 43, the film 69 is softened by a heater 81 and then cooled by air from a nozzle 83 and thereby bonded in place.

A film 69 may be bonded to the underside of the honeycomb structure 61 in a like manner after such structure moves beyond the belt 43. As shown in FIG. 1, this film 69 is guided by roller 85 against the underside of the honeycomb structure 61, softened and pressed by a heater 87 and then cooled as by air from a nozzle 89. A back-up plate 91 is provided oppositely of the heater 87 to prevent upward movement of the composite structure in this area.

Figure 9:
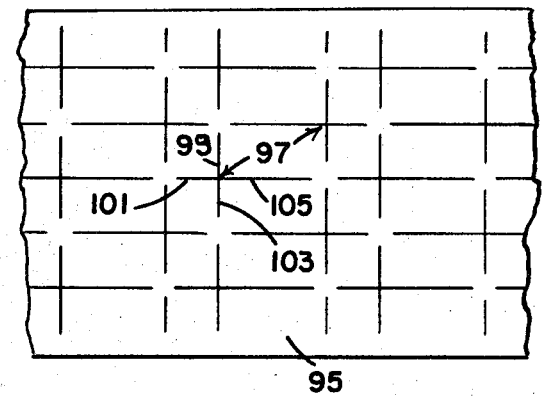

In making the honeycomb structure 61, the slits 23, 25, 27 and 29 of the cross-cuts 21 formed in the film 15 are of substantially the same length and extend along planes which intersect at substantially right angles with each other. While the honeycomb structure which is provided, as shown in FIG. 5, is of a preferred construction, the honeycomb structures may have different cell arrangements. Thus, as illustrated in FIG. 8, a film 91 may be provided with cross-cuts 93 in which the slits thereof extend along planes which intersect at angles other than right angles. A further alternative is shown in FIG. 9 wherein a film 95 is provided with cross-cuts 97, each of which includes three slits 99, 101 and 103 which are of like size and shorter than the slit 105. The slit films 91 and 95 shown in FIGS. 8 and 9, respectively are shaped into honeycomb structures in the same manner as heretofore described.

It is to be understood that changes and variations may be made without departing from the spirit and scope of the present invention as defined in the appended claims.

I claim:

1. An article of manufacture of cellular construction including a series of walls extending along each of a plurality of planes which intersect with each other, and spaced cruciform sections integrally connecting the walls to each other at the locations of intersection of their respective planes, said cruciform sections each having a central portion disposed in a common plane which passes through said series of walls and legs of helical shape extending between said central portion and the walls adjacent thereto.

2. An article as defined in claim 1 wherein the planes of said series of walls intersect at generally right angles with each other and said central portions of said cruciform sections are disposed in a common plane generally perpendicular to the planes of said series of walls.

3. An article as defined in claim 2 wherein each of said walls includes edges which are inclined away from adjacent cruciform sections and extend along intersecting planes to thereby provide diagonally opposed corners.

4. An article as defined in claim 3 further including a continuous flat member disposed generally parallel to the common plane of the central portion of the cruciform section and through which portions of the corners of said walls project, and wherein the projecting portions of said corners are deformed whereby the continuous flat member is locked in place.

5. An article as defined in claim 2 wherein at least the outermost edges of each of said walls are generally parallel to the common plane of the central portions of the cruciform sections, and further including a continuous flat member attached to the outermost edges of said walls at least along one side of the cellular construction.

* * * * *